US012795797B2

(12) United States Patent
Wu

(10) Patent No.: US 12,795,797 B2
(45) **Date of Patent: *Nov. 10, 2026**

(54) TWO-STAGE POWER SUPPLY ARCHITECTURE WITH flyback/LLC AND BUCK CONVERTER FOR LED DISPLAY

(71) Applicant: TEXAS INSTRUMENTS INCORPORATED, Dallas, TX (US)

(72) Inventor: Yang Wu, Guangzhou (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/885,882

(22) Filed: Sep. 16, 2024

(65) Prior Publication Data

US 2025/0008623 A1 Jan. 2, 2025

Related U.S. Application Data

(63) Continuation of application No. 17/514,909, filed on Oct. 29, 2021, now Pat. No. 12,120,790.

(60) Provisional application No. 63/227,758, filed on Jul. 30, 2021.

(51) Int. Cl.

| | |
|---|---|
| ***H05B 45/30*** | (2020.01) |
| ***H02M 3/158*** | (2006.01) |
| ***H05B 45/375*** | (2020.01) |
| ***H05B 45/385*** | (2020.01) |

(52) U.S. Cl.
CPC .......... *H05B 45/375* (2020.01); *H02M 3/158* (2013.01); *H05B 45/385* (2020.01)

(58) Field of Classification Search
CPC ........ H05B 45/32; H05B 45/38; H05B 45/46; H05B 45/375; H05B 45/385; H05B 45/395; H05B 45/3725; H02M 1/007; H02M 1/008; H02M 1/4208; H02M 3/01; H02M 3/158; H02M 3/1588; H02M 3/33569
See application file for complete search history.

(56) References Cited

U.S. PATENT DOCUMENTS

| | | | | |
|---|---|---|---|---|
| 6,265,832 | B1 * | 7/2001 | Maisel ................. | H05B 45/395 315/169.3 |
| 7,675,240 | B2 * | 3/2010 | Yang ...................... | H05B 45/35 315/192 |
| 8,076,872 | B2 | 12/2011 | Sauerlander | |
| 9,386,652 | B1 * | 7/2016 | Lee .................... | H05B 45/3725 |
| 2005/0116922 | A1 | 6/2005 | Kim | |

(Continued)

OTHER PUBLICATIONS

Yang Wu, "Common-Anode Power Supply Solution for Common-Cathode LED Display," Texas Instruments, Application Report, SLUAA89 Jul. 2020, 28 pages.

*Primary Examiner* — Tung X Le
(74) *Attorney, Agent, or Firm* — Zhenhai Fu; Charles F. Koch

(57) ABSTRACT

In an example, a system includes a single-output flyback/LLC converter adapted to be coupled to an alternating current (AC) power supply. The system also includes a buck regulator coupled to the single-output flyback/LLC converter. The system includes a first LED including an anode coupled to the single-output flyback/LLC converter and a cathode coupled to the buck regulator. The system also includes a second LED including an anode coupled to the single-output flyback/LLC converter and a cathode coupled to a ground terminal.

16 Claims, 3 Drawing Sheets

(56) References Cited

U.S. PATENT DOCUMENTS

| | | | | |
|---|---|---|---|---|
| 2007/0080911 | A1 | 4/2007 | Liu | |
| 2007/0291198 | A1 | 12/2007 | Shen | |
| 2009/0015759 | A1 | 1/2009 | Honbo | |
| 2010/0148679 | A1 * | 6/2010 | Chen | H05B 45/46 315/297 |
| 2013/0057163 | A1 | 3/2013 | Sutardja | |
| 2014/0117867 | A1 | 5/2014 | Elferich | |
| 2014/0361711 | A1 | 12/2014 | Takahashi | |
| 2016/0338171 | A1 * | 11/2016 | Bhagat | F21V 23/0471 |
| 2017/0245338 | A1 | 8/2017 | Turunen | |

* cited by examiner

TWO-STAGE POWER SUPPLY ARCHITECTURE WITH flyback/LLC AND BUCK CONVERTER FOR LED DISPLAY

CROSS-REFERENCE TO RELATED APPLICATIONS

The present application is a continuation of application Ser. No. 17/514,909 filed Oct. 29, 2021, which claims priority to U.S. Provisional Patent Application No. 63/227,758, which was filed Jul. 30, 2021, and is hereby incorporated herein by reference in its entirety.

BACKGROUND

A common-anode light emitting diode (LED) display has a single power supply to provide power to LEDs of all three primary colors (red, green, blue). Because red LEDs have different voltage specifications than blue and green LEDs, an external resistor is coupled in series to a red LED to limit the voltage across the red LED. An alternative approach is to power the red, green, and blue LEDs with separate power supplies. Yet another approach includes using two flyback/LLC (inductor-inductor-capacitor, or LLC) converters (or one dual-output flyback/LLC converter), with a first flyback/LLC converter providing voltage for the red LED and a second flyback/LLC converter providing voltage for the blue and green LEDs. Flyback/LLC converters include a resonant tank circuit that has two inductors and a capacitor.

SUMMARY

In accordance with at least one example of the description, a system includes a single-output flyback/LLC converter adapted to be coupled to an alternating current (AC) power supply. The system also includes a buck regulator coupled to the single-output flyback/LLC converter. The system includes a first LED including an anode coupled to the single-output flyback/LLC converter and a cathode coupled to the buck regulator. The system also includes a second LED including an anode coupled to the single-output flyback/LLC converter and a cathode coupled to a ground terminal.

In accordance with at least one example of the description, a system includes a single-output flyback/LLC converter adapted to be coupled to an AC power supply. The system also includes a buck regulator coupled to the single-output flyback/LLC converter. The system includes a first LED including an anode coupled to the buck regulator and a cathode coupled to a ground terminal, where the buck regulator is configured to provide a first voltage to the first LED. The system includes a second LED including an anode coupled to the single-output flyback/LLC converter and a cathode coupled to the ground terminal, where the single-output flyback/LLC converter is configured to provide a second voltage to the second LED.

In accordance with at least one example of the description, a system includes a single-output flyback/LLC converter adapted to be coupled to an AC power supply. The system also includes a buck regulator coupled to the single-output flyback/LLC converter. The system includes a first load coupled to the single-output flyback/LLC converter, where the single-output flyback/LLC converter is configured to provide a first voltage to the first load. The system includes a second load coupled to the buck regulator, where the buck regulator is configured to provide a second voltage to the second load, and where the first voltage is different than the second voltage.

DETAILED DESCRIPTION

Figure 1:
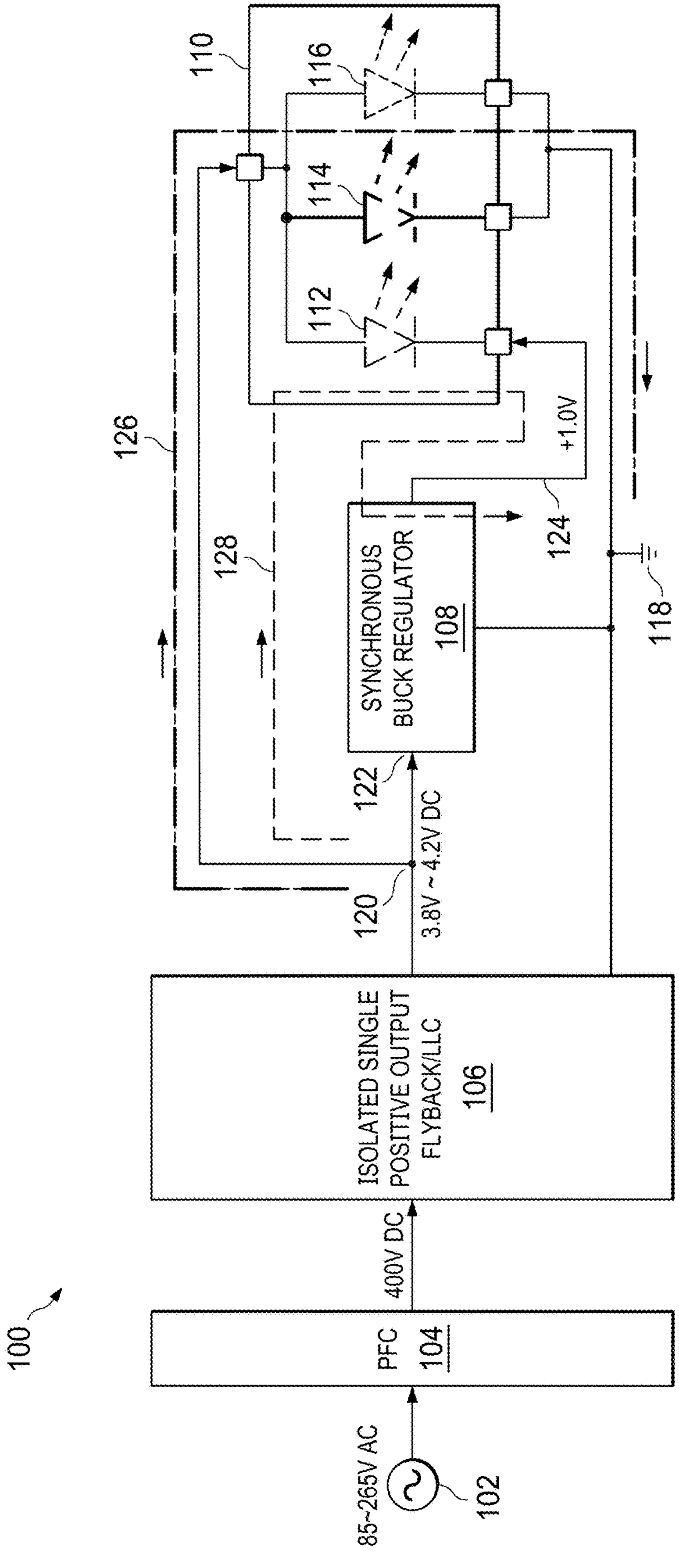
FIG. 1 is a block diagram for an example two-stage power architecture for driving an LED display system, in accordance with various examples.

Many existing LED displays implement a common anode architecture, in which the anode (positive) sides of the LEDs are electrically connected. One conventional solution includes two flyback/LLC converters to provide voltage to the LEDs. Alternating current (AC) power is provided to a power factor correction (PFC) stage. The PFC stage improves the efficiency of the power system and provides direct current (DC) power to two flyback/LLC converters (or one dual-output flyback/LLC converter). Because green and blue LEDs have different voltage specifications than red LEDs, one flyback/LLC converter provides voltage for the red LED, while the other flyback/LLC converter provides voltage for the blue and green LEDs. However, having two flyback/LLC converters (or one dual-output flyback/LLC converter) increases the cost and size of the system. Flyback/LLC converters may have large losses from the internal transformers, and a dual-output flyback/LLC converter may have poor cross-regulation where a change in a load coupled to a first output alters the voltage provided at the other output.

Examples described herein include a two-stage power architecture. The first stage is a single-output flyback/LLC converter that provides a voltage that drives the green and blue LEDs. The output voltage of the single-output flyback/LLC converter is also provided to a buck regulator. The buck regulator comprises the second stage. The buck regulator provides a floating ground voltage for the red LED. Therefore, the proper voltage is provided for each of the red, blue, and green LEDs. The two-stage architecture is smaller, thinner, cheaper, and more efficient than a conventional architecture that implements two flyback/LLC converters or one dual-output flyback/LLC converter. The two-stage power architecture may be useful for common-anode as well as common-cathode LED systems.

The same reference numbers or other reference designators are used in the drawings to designate the same or similar functional and/or structural features.

FIG. 1 is a two-stage power architecture 100 for driving an LED display system in accordance with various examples herein. Architecture 100 has a common-anode LED structure. Architecture 100 includes AC power source 102, PFC stage 104, single-output flyback/LLC converter 106, buck regulator 108, and LED structure 110. LED structure 110 includes red LED 112, green LED 114, and blue LED 116. In this example, only one LED is shown for each color, but any number of LEDs or arrays of LEDs may be present in other examples. Architecture 100 also includes ground 118 and node 120. Ground 118 may be a ground terminal in examples herein. Buck regulator 108 includes input 122 and output 124. Input 122 is coupled to node 120 and single-output flyback/LLC converter 106. Output 124 is coupled to the cathode of red LED 112. Architecture 100 also includes flow pathways for currents 126 and 128. Architecture 100 may include other circuitry not shown here for simplicity, such as LED driver circuitry inside the LED structure 110, biasing circuitry, etc.

In an example, PFC stage 104 receives AC voltage from AC power source 102 and provides a DC voltage to single-output flyback/LLC converter 106, such as 400 V. Single-output flyback/LLC converter 106 provides approximately 3.8 to 4.2 V at the output of single-output flyback/LLC converter 106. This voltage is provided to the anodes of red LED 112, green LED 114, and blue LED 116. This voltage is also provided to input 122 of buck regulator 108. Buck regulator 108 is a DC to DC converter that receives 3.8 to 4.2 V at its input 122 and produces approximately 1.0 V at its output 124. The 1.0 V is provided to the cathode of red LED 112. The anode of green LED 114 and blue LED 116 is at 3.8 to 4.2 V, while the cathodes of green LED 114 and blue LED 116 are coupled to ground 118 (e.g., 0 V). Therefore, green LED 114 and blue LED 116 are driven with a voltage of 3.8 to 4.2 V. The anode of red LED 112 is at 3.8 to 4.2 V. However, the cathode of red LED 112 is coupled to output 124, which provides a voltage of 1.0 V relative to ground. Therefore, the voltage across red LED 112 is approximately 2.8 to 3.2 V. Each LED is driven with a voltage within the voltage ranges described above in this example.

Architecture 100 provides a different voltage for the red LED 112 than it does for green LED 114 and blue LED 116, but it provides that voltage more efficiently than the conventional systems that have two flyback/LLC converters or one dual-output flyback/LLC converter. In one example, an LED panel with 480×270 resolution has 84% efficiency using the conventional solution with two flyback/LLC converters or one dual-output flyback/LLC converter. In at least one example, a similar LED panel that implements two-stage power architecture 100 described herein has 88% efficiency. Also, an LED panel that implements two-stage power architecture 100 may be smaller and thinner than the conventional solution because the two-stage power architecture 100 only has one single-output flyback/LLC converter and therefore only one transformer. With only one single-output transformer, cross-regulation is usually not a problem.

FIG. 1 shows the current flow in architecture 100 for each type of LED. Current 126 represents the current that flows through green LED 114 and blue LED 116. Current 126 flows from node 120 to the anodes of green LED 114 and blue LED 116, through green LED 114 and blue LED 116, and then to ground 118. Current 128 flows from node 120 to the anode or red LED 112, through red LED 112, and then into output 124 of buck regulator 108. Current 128 then flows to ground 118.

Buck regulator 108 is a synchronous buck regulator in some examples. During steady state operation, buck regulator 108 sinks current rather than sourcing current (e.g., the inductor current within buck regulator 108 is negative). This is shown by the flow of current 128 in FIG. 1. In some examples, buck regulator 108 should have the ability to sink the appropriate amount of current 128 for proper operation.

Figure 2:
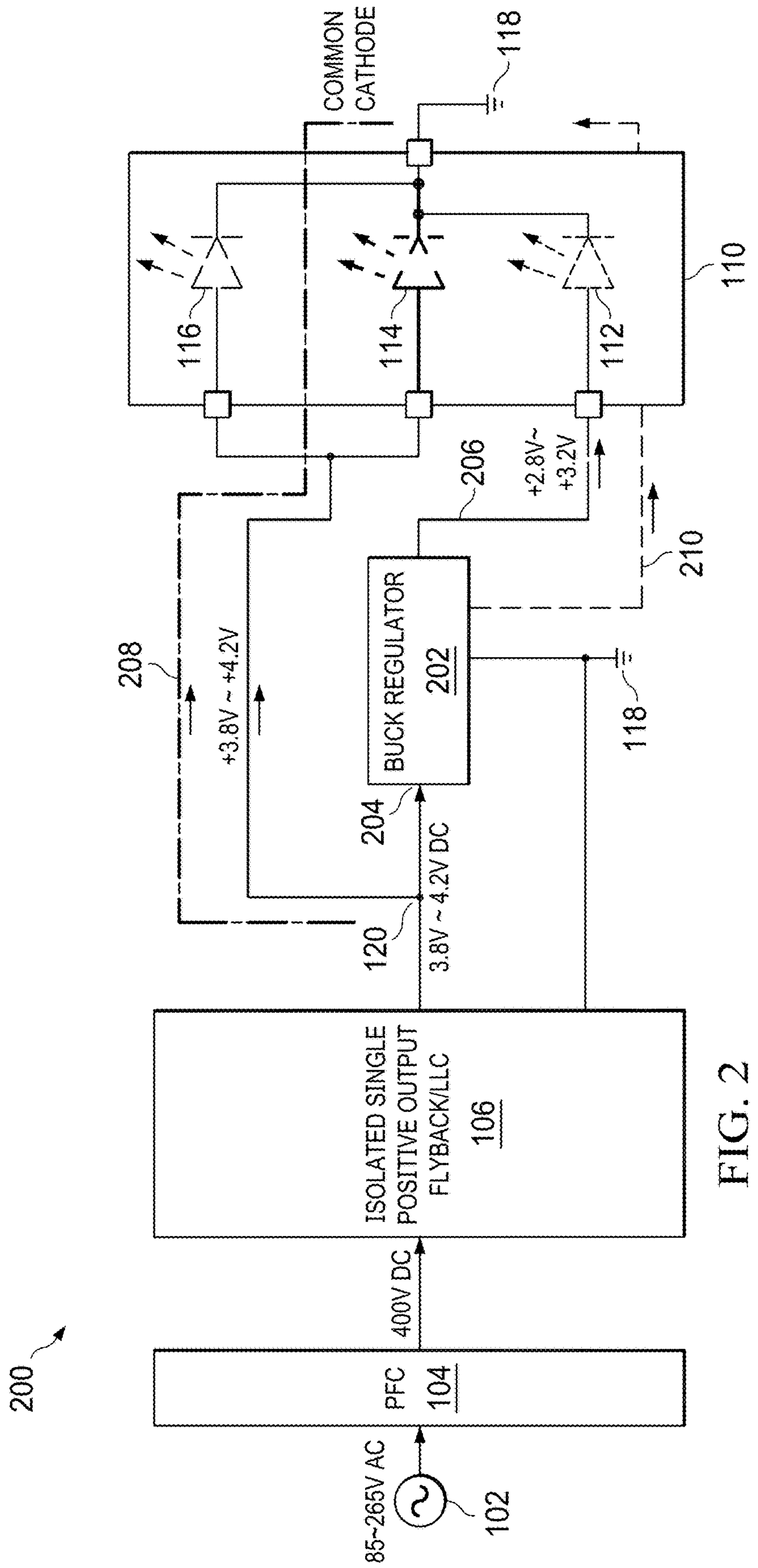
FIG. 2 is a block diagram for an example two-stage power architecture for driving an LED display system, in accordance with various examples.

FIG. 2 is a two-stage power architecture 200 for driving an LED display system in accordance with various examples herein. In FIG. 2, the same reference numbers or other reference designators are used as in FIG. 1 to designate the same or similar functional and/or structural features. The structure and operation of many of the components of architecture 200 are described above with respect to FIG. 1, so a detailed explanation of some of the components of architecture 200 is omitted for simplicity.

Architecture 200 is a common-cathode architecture in accordance with one example. Architecture 200 includes AC power source 102, PFC stage 104, flyback/LLC converter 106, buck regulator 202, and LED structure 110. Buck regulator 202 may be a synchronous buck regulator in some examples. LED structure 110 includes red LED 112, green LED 114, and blue LED 116. In this example, only one LED is shown for each color, but any number of LEDs or arrays of LEDs may be present in other examples. Architecture 200 also includes ground 118 and node 120. Architecture 200 includes buck regulator 202, which has input 204 and output 206. Input 204 is coupled to node 120 and single-output flyback/LLC converter 106. Output 206 is coupled to the anode of red LED 112. Node 120 is coupled to the anodes of green LED 114 and blue LED 116. The cathodes of red LED 112, green LED 114, and blue LED 116 are coupled to ground 118. Architecture 200 also provides flow pathways for currents 208 and 210. Architecture 200 may include other circuitry not shown here for simplicity, such as LED driver circuitry inside LED structure 110, biasing circuitry, etc.

In an example, architecture 200 provides a 3.8 to 4.2 V voltage to the anodes of green LED 114 and blue LED 116, via the output of flyback converter 106. Architecture 200 provides 2.8 to 3.2 V at the anode of red LED 112 via the output 206 or buck regulator 202. Each LED is driven with a proper voltage in this example.

Architecture 200 shows the current flow for each type of LED. Current 208 represents the current that flows through green LED 114 and blue LED 116. Current 208 flows from node 120 to the anodes of green LED 114 and blue LED 116, through green LED 114 and blue LED 116, and then to ground 118. Current 210 flows from buck regulator 202, through red LED 112, and then into ground 118. In this example, buck regulator 202 sources current rather than sinking current.

Figure 3:
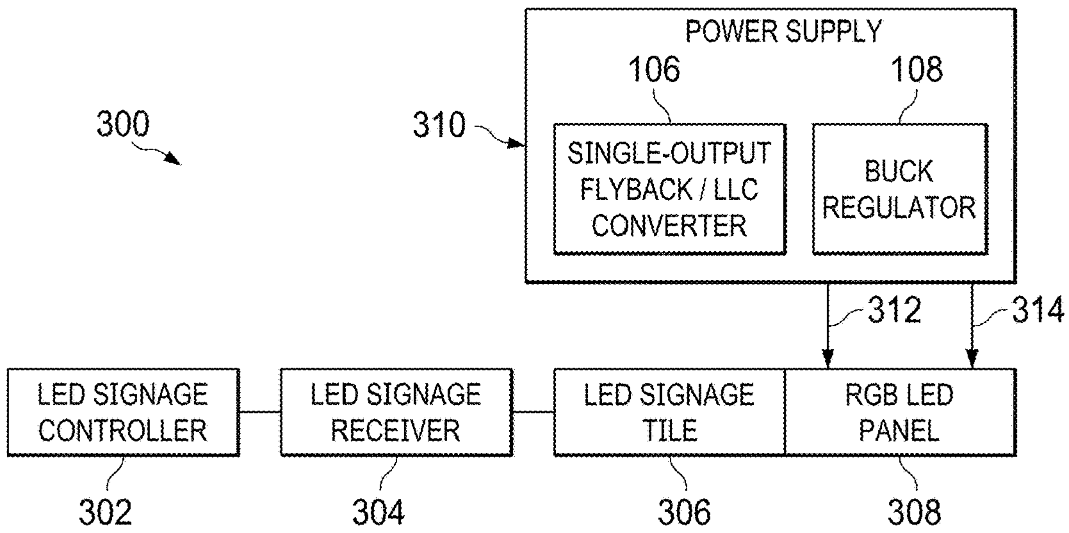
FIG. 3 is a block diagram of an LED signage system in accordance with various examples.

FIG. 3 is a block diagram of an LED signage system 300 in accordance with various examples herein. In FIG. 3, the same reference numbers or other reference designators are used as in FIG. 1 to designate the same or similar functional and/or structural features. The structure and operation of many of the components of LED signage system 300 are described above with respect to FIG. 1, so a detailed explanation of some of the components of LED signage system 300 is omitted for simplicity.

LED signage system 300 is one example application for the two-stage power architecture described herein. Other applications may be useful as well. An LED signage system includes hardware for providing LED signs and displays. A user may produce images with text or graphics on LED displays with LED signage system 300. In an example, LED signage system 300 includes LED signage controller 302, LED signage receiver 304, LED signage tile 306, and RGB LED panel 308. LED signage system 300 also includes power supply 310, which has single-output flyback/LLC converter 106 and buck regulator 108. Path 312 indicates the path for power to be supplied to the red LEDs, and path 314 indicates the path for power to be supplied to the green and blue LEDs. In this example, power supply 310 includes the two-stage power architecture as described in FIG. 1 to provide power to red, green, and blue LEDS in RGB LED panel 308. A separate, lower voltage is provided to the red LEDs than the voltage provided to the green and blue LEDs, as described above.

A number of components are omitted from LED signage system 300 for simplicity. For example, LED signage controller 302 may include a field programmable gate array (FPGA), a controller, and input and output ports. The LED signage controller 302 provides signals and instructions to the LED signage receiver 304. LED signage receiver 304 may also include an FPGA, input ports, and communication interfaces. The LED signage receiver 304 provides signals and instructions to the LED signage tile 306. LED signage tile 306 may include LED drivers, temperature sensors, and decoders, and is useful for driving the LEDs in RGB LED panel 308. Power supply 310 may include other power-related components, such as switches, voltage converters, and voltage references. The components of LED signage system 300 provide the ability to display text or images on LED panels or displays.

While the examples herein refer to providing voltages for LEDs, voltages may be provided for any other components in other examples. The two-stage power architecture described herein may provide a first voltage to a first load at the output of the single-output flyback/LLC converter 106. The two-stage power architecture may also provide a second voltage to a second load at the output of the buck regulator 108 or 202. The examples herein may be useful for any application that includes multiple voltage outputs. Multiple voltage outputs may be provided more efficiently with the two-stage power architecture described herein than with the conventional one-stage systems.

Figure 4:
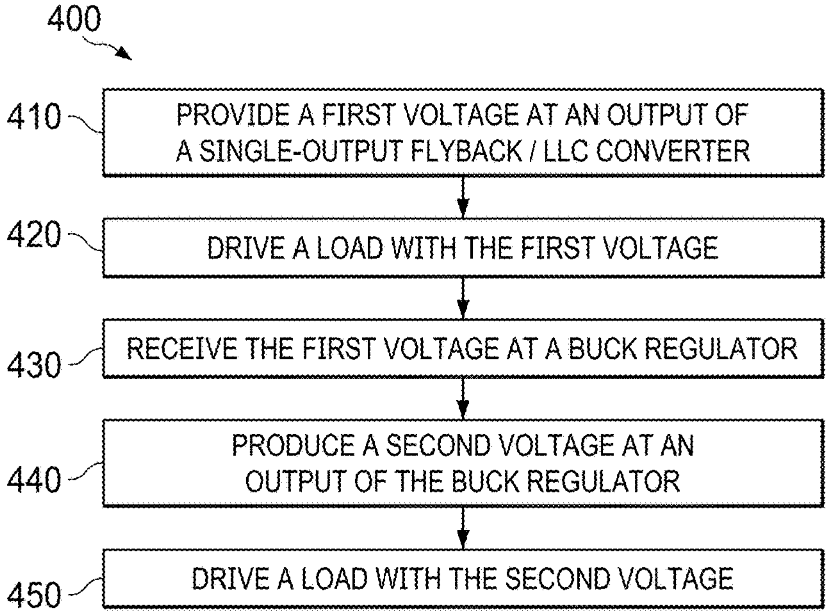
FIG. 4 is a flow diagram for a method for providing power with a two-stage power architecture in accordance with various examples.

FIG. 4 is a flow diagram of a method for providing power with a two-stage power architecture in accordance with various examples herein. The steps of method 400 may be performed in any suitable order. The hardware components described above with respect to FIGS. 1-3 may perform method 400 in some examples.

Method 400 begins at 410, where a flyback converter provides a first voltage at an output. As described above, single-output flyback/LLC converter 106 provides a first voltage of approximately 3.8 to 4.2 V in one example.

Method 400 continues at 420, where the flyback converter drives a first load with the first voltage. In one example, the first load is one or more LEDs. In an example described above, the first load includes green and blue LEDs. In other examples, the first load could be only green LEDs or only blue LEDs.

Method 400 continues at 430, where a buck regulator receives the first voltage. In one example, the buck regulator is a synchronous buck regulator such as buck regulator 108.

Method 400 continues at 440, where the buck regulator, responsive to receiving the first voltage, provides a second voltage at an output of the buck regulator. In one example, as described above with respect to FIG. 1, the buck regulator 108 provides a voltage of approximately 1.0 V at its output 124. In some examples, the first voltage is greater than the second voltage.

Method 400 continues at 450, where the buck regulator 108 drives a load with the second voltage. In one example, the second load is a red LED, and the buck regulator 108 sinks current from the second load. In another example, the second load is a red LED, and the buck regulator 202 sources current to the second load.

Figure 5:
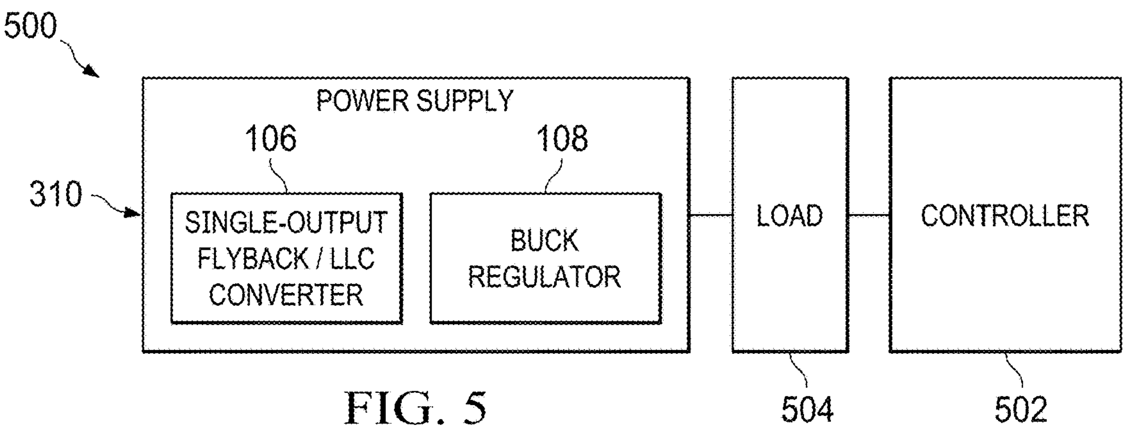
FIG. 5 is a block diagram of a system for driving a load in accordance with various examples.

FIG. 5 is a block diagram of a system 500 for driving a load in accordance with various examples herein. System 500 includes power supply 310, controller 502, and load 504. Power supply 310 includes single-output flyback/LLC converter 106 and buck regulator 108 as described above. In examples, power supply 310 provides multiple voltages to a load 504 as described herein. If load 504 includes an array of LEDs, power supply 310 may provide different voltages to different LEDs. Power supply 310 may provide voltages for other types of loads in other examples. Controller 502 may provide circuitry for managing or driving load 504. For example, if load 504 includes an array of LEDs, controller 502 may drive the LEDs in the array to produce text or images on a display.

In examples herein, multiple voltage outputs may be provided more efficiently with the two-stage power architecture than with the conventional one-stage systems. In some examples, a proper voltage is provided for each of red, blue, and green LEDs. The two-stage architecture described herein is smaller, thinner, cheaper, and has higher efficiency than the conventional architecture that includes two flyback/LLC converters or one dual-output flyback/LLC converter. The two-stage architecture may be useful for common-anode as well as common-cathode LED systems in some examples. The two-stage architecture also avoids cross-regulation caused by multi-output transformers.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Uses of the phrase "ground" in the foregoing description include a chassis ground, an Earth ground, a floating ground, a virtual ground, a digital ground, a common ground, and/or any other form of ground connection or ground terminal applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

What is claimed is:

1. A circuit, comprising:

a single-output voltage converter having a converter output and first and second converter inputs, wherein the first converter input is coupled to a power supply input, and the second converter input is coupled to a ground terminal;

a buck regulator having first and second buck inputs and a buck output, wherein the first buck input is coupled to the converter output, and the second buck input is coupled to the second converter input;

first and second LED input terminals, wherein the first LED input terminal is coupled to the converter output, and the second LED input terminal is coupled to the buck output; and third and fourth LED input terminals, wherein the third LED input terminal is coupled to the converter output, and the fourth LED input terminal is coupled to the second converter input and the ground terminal.

2. The circuit of claim 1, further comprising fifth and sixth LED input terminals, wherein the fifth LED input terminal is coupled to the converter output, and the sixth LED input terminal is coupled to the second converter input and the ground terminal.

3. The circuit of claim 1, wherein the buck regulator is configured to provide a first voltage to the second LED input terminal, and the single-output voltage converter is configured to provide a second voltage to the third LED input terminal.

4. The circuit of claim 3, wherein the second voltage is greater than the first voltage.

5. The circuit of claim 1, wherein the buck regulator is configured to sink current from the second LED input terminal.

6. The circuit of claim 1, wherein the buck regulator is a synchronous buck regulator.

7. The circuit of claim 1, wherein the power supply input is configured to receive an alternating current (AC) signal.

8. A system, comprising:

a single-output voltage converter having a converter output and first and second converter inputs, wherein the first converter input is configurable to receive an alternating current (AC) power signal, and the second converter input is coupled to a ground terminal;

a buck regulator having first and second buck inputs and a buck output, wherein the first buck input is coupled to the converter output, and the second buck input is coupled to the second converter input and the ground terminal;

first and second LED input terminals, wherein the first LED input terminal is coupled to the buck output, and the second LED input terminal is coupled to the ground terminal; and third and fourth LED input terminals, wherein the third LED input terminal is coupled to the converter output, and the fourth LED input terminal is coupled to the second converter input and the ground terminal.

9. The system of claim 8, further comprising fifth and sixth LED input terminals, wherein the fifth LED input terminal is coupled to the converter output, and the sixth LED input terminal is coupled to the second converter input and the ground terminal.

10. The system of claim 8, wherein the buck regulator is configured to source current to the first LED input terminal.

11. The system of claim 8, wherein the buck regulator is a synchronous buck regulator.

12. A circuit, comprising:

a single-output voltage converter having a converter output and first and second converter inputs, wherein the second converter input is coupled to a ground terminal, and the single-output voltage converter is configured to provide a first voltage at the converter output;

a buck regulator having first and second buck inputs and a buck output, wherein the first buck input is coupled to the converter output, the second buck input is coupled to the second converter input, and the buck regulator is configured to provide a second voltage at the buck output;

first and second load terminals, wherein the first load terminal is coupled to the converter output, and the second load terminal is coupled to the second buck input and the ground terminal; and third and fourth load terminals, wherein the third load terminal is coupled to the converter output, and the fourth load terminal is coupled to the buck output.

13. The circuit of claim 12, wherein the first load terminal is coupled to the third load terminal.

14. The circuit of claim 12, wherein the buck regulator is configured to sink current from the third load terminal.

15. The circuit of claim 12, wherein the buck regulator is configured to source current to the third load terminal.

16. The circuit of claim 12, wherein the buck regulator is a synchronous buck regulator.

* * * * *